May 30, 1961 V. W. WEAVER 2,986,256
TYPING MACHINE
Filed March 24, 1959 10 Sheets-Sheet 1

INVENTOR.
VANCE W. WEAVER
BY
ATTORNEYS.

INVENTOR.
VANCE W. WEAVER

May 30, 1961  V. W. WEAVER  2,986,256
TYPING MACHINE
Filed March 24, 1959  10 Sheets-Sheet 3
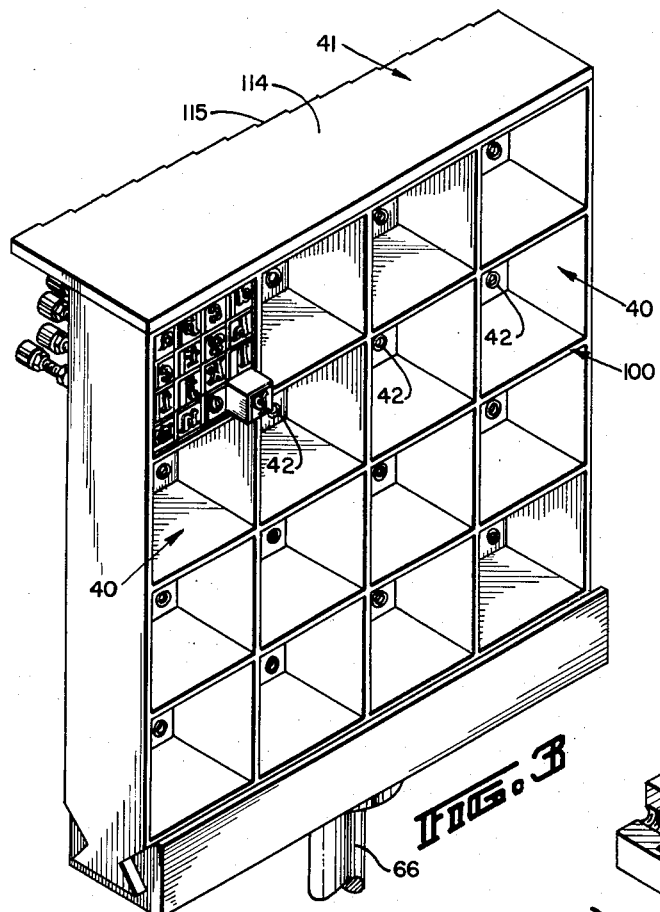
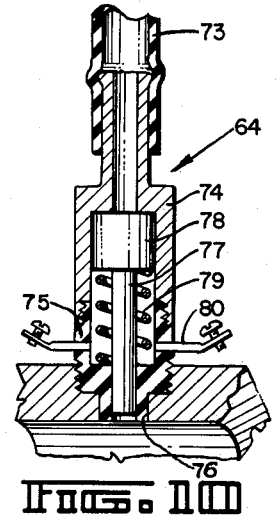
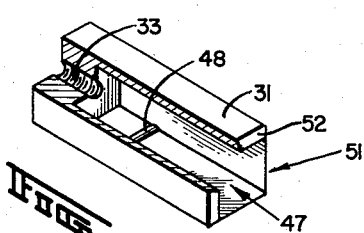
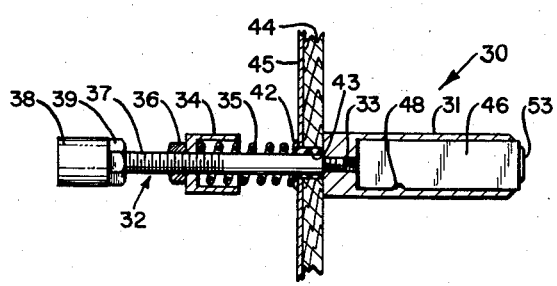
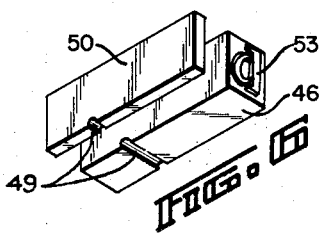
INVENTOR.
VANCE W. WEAVER
BY
Pollard, Johnston, Smythe & Robertson
ATTORNEYS.

May 30, 1961  V. W. WEAVER  2,986,256
TYPING MACHINE
Filed March 24, 1959  10 Sheets-Sheet 4
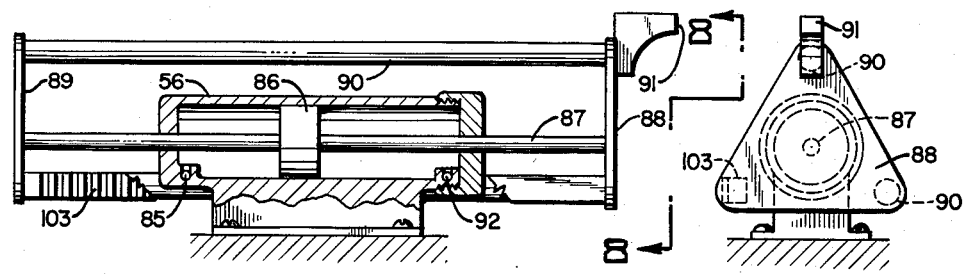
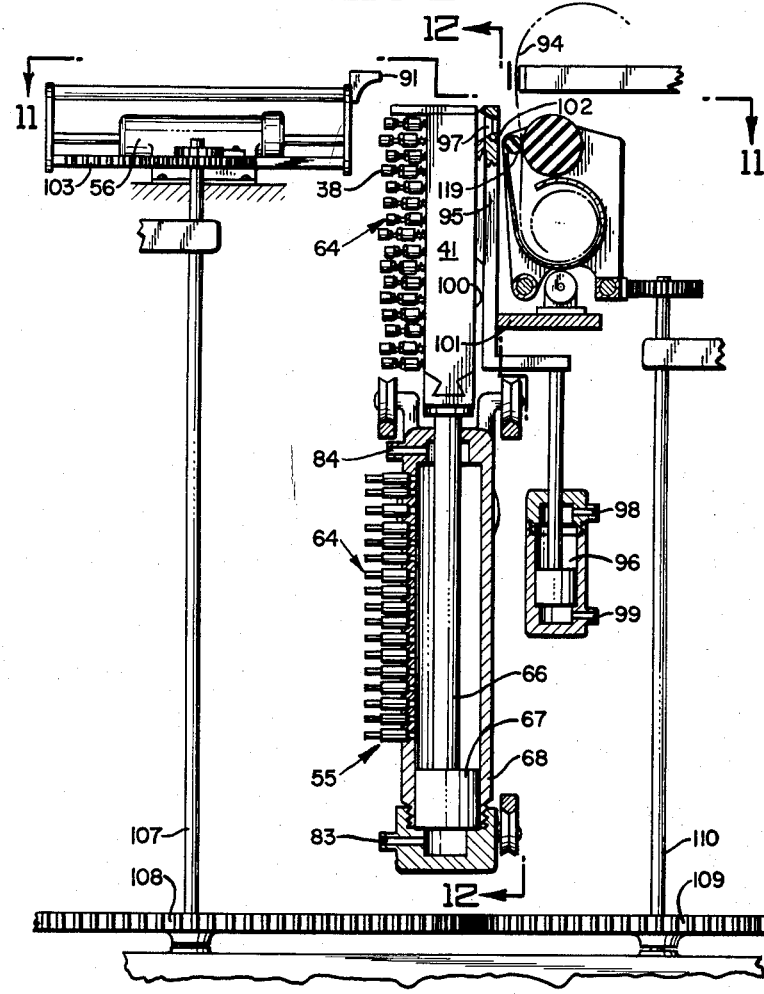
INVENTOR.
VANCE W. WEAVER
BY
ATTORNEYS.

INVENTOR.
VANCE W. WEAVER

May 30, 1961 V. W. WEAVER 2,986,256
TYPING MACHINE
Filed March 24, 1959 10 Sheets-Sheet 6

INVENTOR.
VANCE W. WEAVER
BY
ATTORNEYS.

May 30, 1961 V. W. WEAVER 2,986,256
TYPING MACHINE

Filed March 24, 1959 10 Sheets-Sheet 7

INVENTOR.
VANCE W. WEAVER
BY
Pollard, Johnston, Smyth & Robertson
ATTORNEYS.

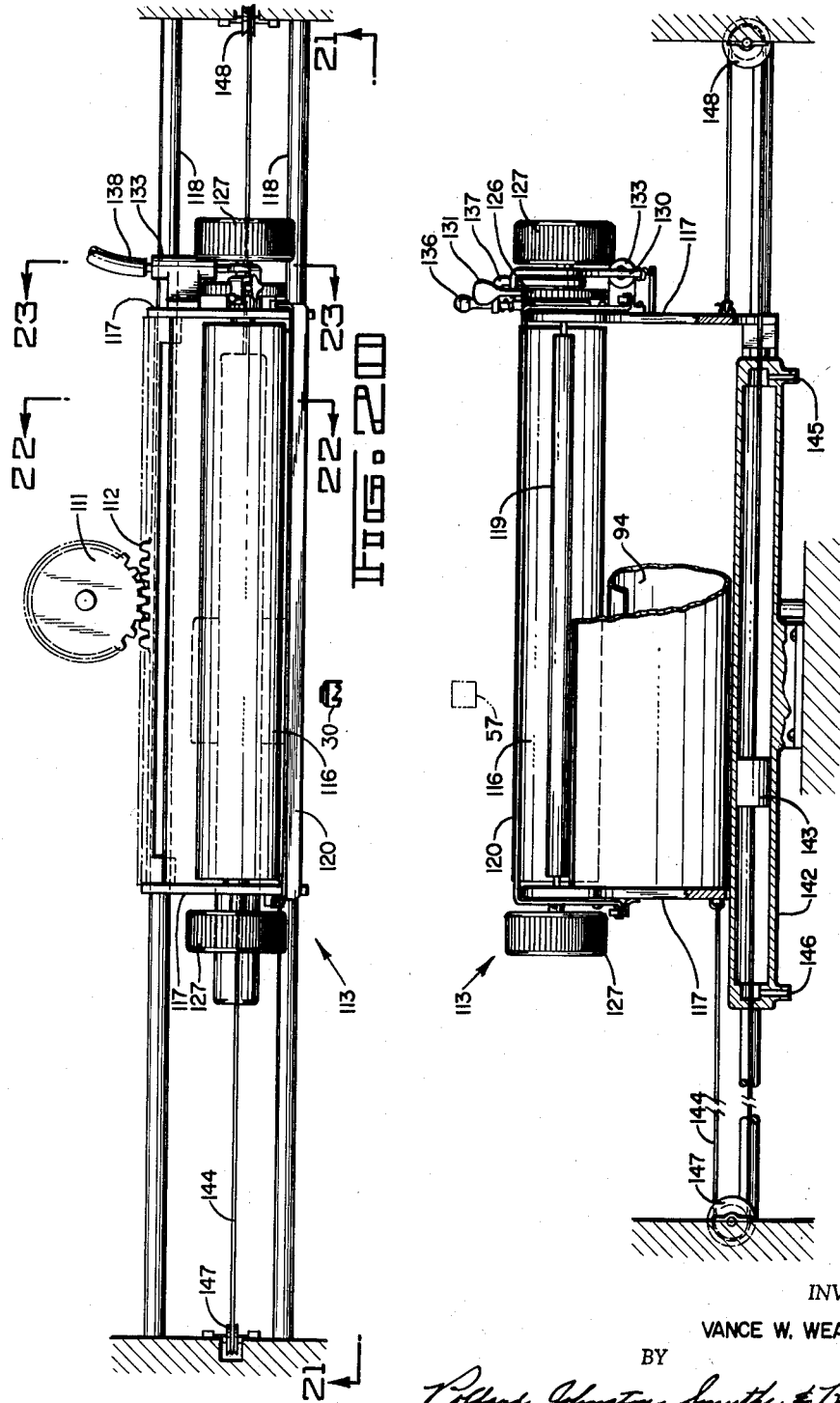

May 30, 1961 V. W. WEAVER 2,986,256
TYPING MACHINE

Filed March 24, 1959 10 Sheets-Sheet 9

INVENTOR.
VANCE W. WEAVER
BY
*Pollard, Johnston, Smythe & Robertson*
ATTORNEYS.

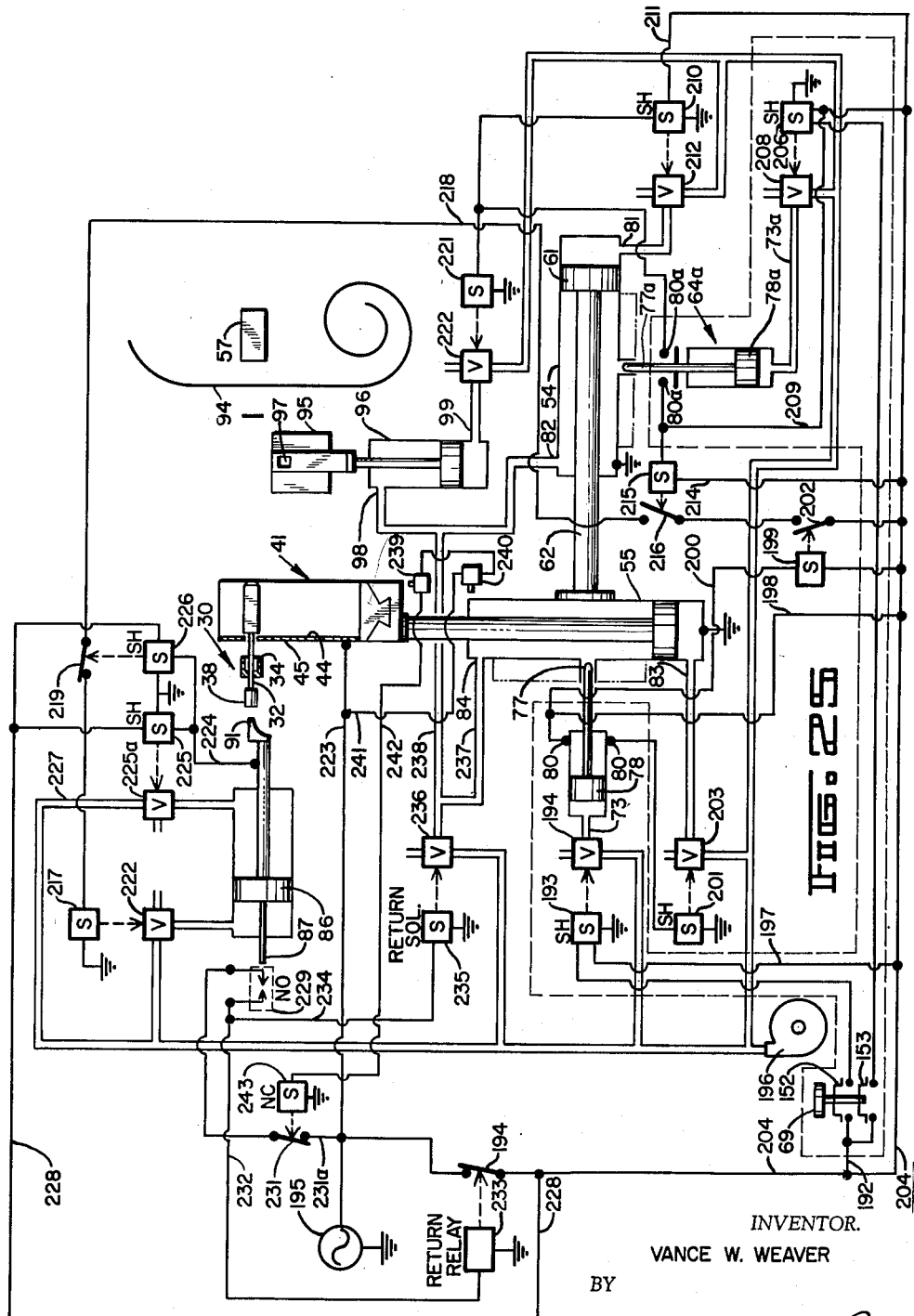

United States Patent Office 2,986,256
Patented May 30, 1961

2,986,256
TYPING MACHINE
Vance W. Weaver, 2465 Broadway, New York, N.Y.
Filed Mar. 24, 1959, Ser. No. 801,513
42 Claims. (Cl. 197—56)

This invention relates to a typing machine, and in particular to a machine capable of printing a great range of letters, numbers, characters and symbols.

In printing, a great variety of characters are required. For example, in a normal book page, separate characters are required for roman, italicized, boldface and capital letters. In addition to these characters, special symbols are also required. In an attempt to overcome the difficulties caused by the requirement of a great number of characters complex machines are employed which cast the necessary type slugs as needed. Another approach to the problem has been the use of photocomposing machines. In order to avoid the expense, complexity and equipment requirements of these methods, typewriters are used to produce a photographable image which may then be reproduced by any of the several methods of printing. The typewriters employ either baskets of type or drums of type. The typewriter with a basket of type, such as a conventional office machine, has a limited number of keys. In some machines of this kind, the type may be interchanged. The typewriter with a drum of type normally has a greater number of available characters than the basket machine but additional drums of type must be used to obtain variety. It is evident that with these typewriters, the work must be interrupted periodically in order that additional characters may be made available. In addition the change of baskets or drums of type can be difficult and costly.

The requirement of a great variety of characters leads to a problem in spacing between the printed characters. A conventional office typewriter provides uniform spacing regardless of the width of the typed character. Uniform spacing is unsatisfactory in the case of many symbols, letters and characters whose width varies to a great degree. Variable spacing has been employed in some typewriters but it has been done on a compromise basis. Such machines provide a very limited number of different spacings for different width characters. There is no provision to set very fine incremental changes in spacing so that the spacing of each character accurately conforms to its width.

The applicant's typing machine accommodates a great range of characters because of its type case construction with its attendant large capacity of type. The typing member is a typestick which contains a slug of type. The type sticks are easily substituted for type sticks in the typecase whenever additional characters are required. The typestick utilizes available type slugs so that advantage may be taken of the vast variety of slugs produced by conventional metal-casting machines. This insures that the typing machine has access to practically every character in existence. The applicant's machine is provided with positive control in very fine increments of the space in the printed line allotted to each character. The spacing control is selectively provided for each individual character with the result that characters may be freely interchanged without regard to spacing patterns.

Applicant's machine is well suited to the preparation of scientific material for printing since the requirement of a number of special symbols and figures increases the number of required characters. In addition to printing, applicant's machine can perform operations such as the embossing and stamping of suitable receiving surfaces.

*Summary*

The typing machine produces lines of type face characters on receiving surfaces such as paper or duplicating masters. The type members are typesticks which include type slugs mounted in shells supported within a type case. Studs attached to the shells carry stop collars which limit the extent of movement of the typestick from the type case. Springs between the stop collars and the type case hold the typesticks within the type case.

When the operator depresses a keybutton in order to impress a character on the paper, the machine cycle of operation begins. A number of selecting pins on each of the cylinders moving the type case are extended into the cylinder. The pistons advance until stopped by the extended pin. At this point, the type case is positioned so that the selected typestick is aligned with the machine printing position.

With the type case positioned, a hammer is actuated to strike the end of the typestick and move it from the type case so as to impress the type slug against the paper. The stop collar on the stud of the typestick limits the travel of the typestick when the collar contacts the type case. The hammer then returns and the typestick resumes its position within the type case.

The carriage supporting the paper is spaced during the return stroke of the hammer. A rack attached to the hammer drives gearing meshed with a rack on the carriage. The spacing of the carriage is dependent upon the length of the stroke of the hammer which in turn is dependent upon the clearance between the hammer in its rest position and the end of the selected typestick. Spacer elements of selected lengths are arranged between the hammer and the typestick to control the clearance at the hammer and thereby to control the stroke of the hammer. Since the hammer stroke drives the gearing, it determines the spacing of the carriage.

After the return of the hammer and the spacing of the carriage, the cylinders positioning the type case return it to a rest position. The various control elements are also returned to a rest position and the typing machine is in a condition ready for the next depression of a keybutton by the operator.

*Description*

In the drawings where I have illustrated the best mode contemplated by me for carrying out my invention:

Fig. 3 is an enlarged perspective view showing the rear side of the type case.

Fig. 4 is an enlarged sectional view of the typestick.

Fig. 5 is an enlarged fragmentary perspective view of the typestick shell.

Fig. 6 is an enlarged perspective view of the type slug.

Fig. 7 is an enlarged sectional elevational view showing the hammer cylinder.

Fig. 8 is an enlarged sectional view of the hammer and hammer cylinder taken along the line 8—8 of Fig. 7.

Fig. 9 is an enlarged sectional elevational view of the type case, locating cylinder, hammer cylinder, and drive to the carriage.

Fig. 10 is an enlarged, sectional view of the selecting pin.

3

Figure 12:
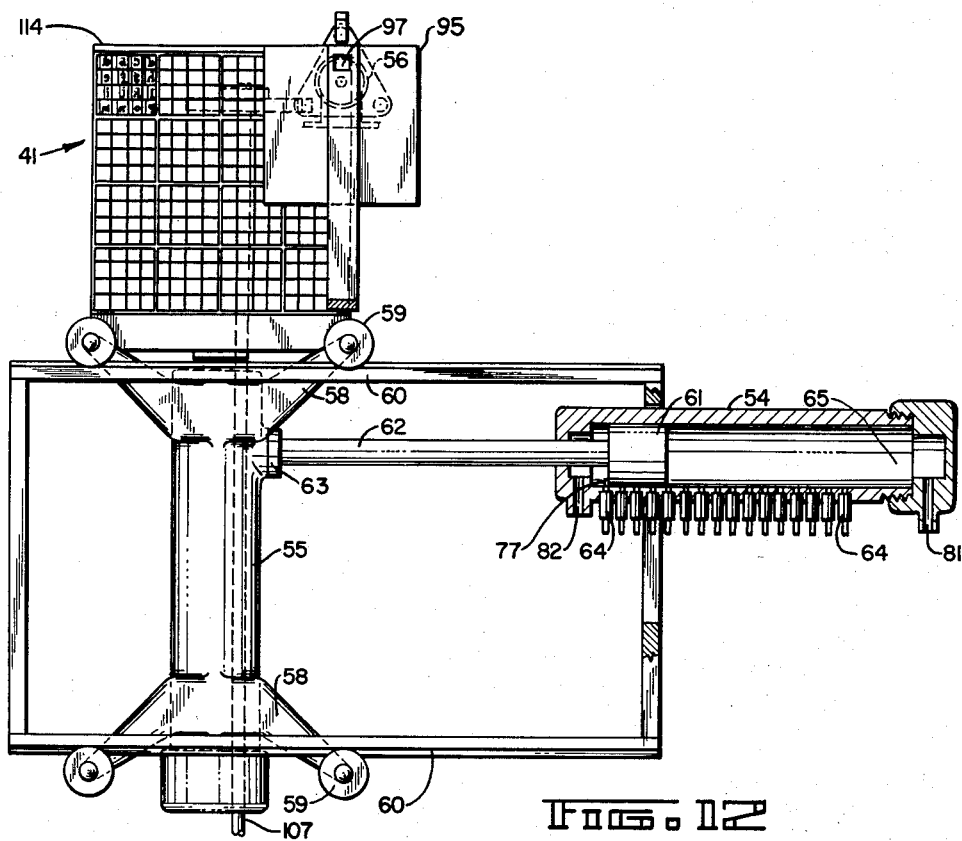

Fig. 12 is an enlarged sectional view of the rear of the type case and the locating cylinders taken along the line 12—12 in Fig. 9.

Figure 13:
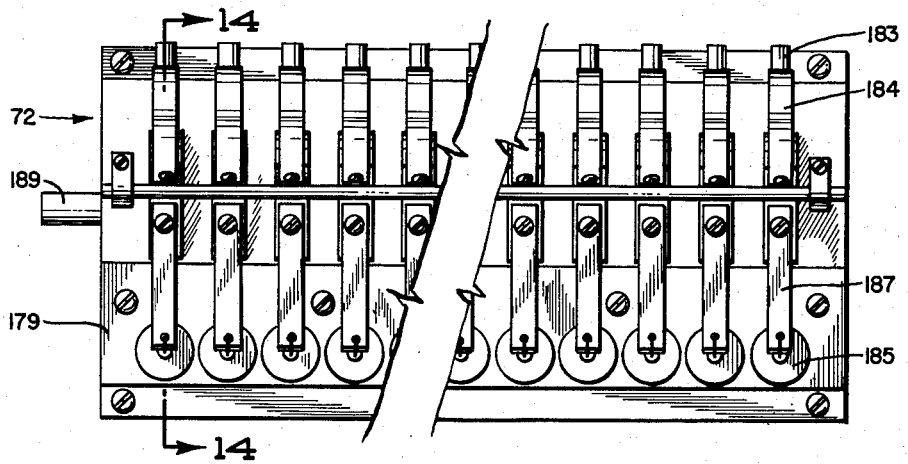

Fig. 13 is an enlarged plan view of the solenoid valves.

Figure 14:
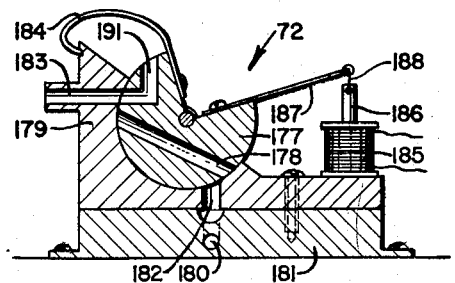

Fig. 14 is an enlarged sectional view of the solenoid valve taken along the line 14—14 of Fig. 13.

Figure 15:
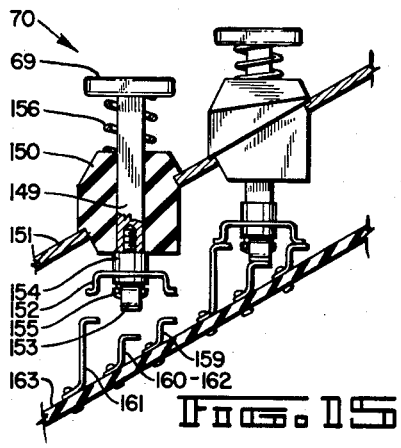

Fig. 15 is an enlarged sectional elevational view of the keybuttons and print contact plate.

Figure 16:
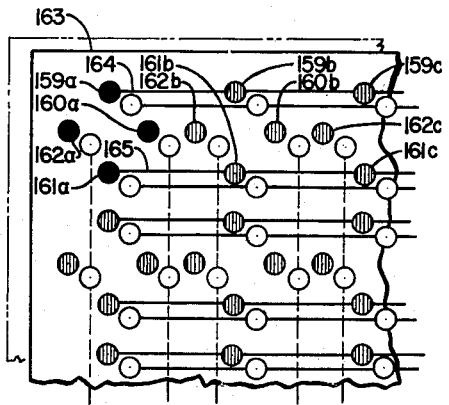

Fig. 16 is an enlarged fragmentary plan view of the printed contact board.

Figure 17:
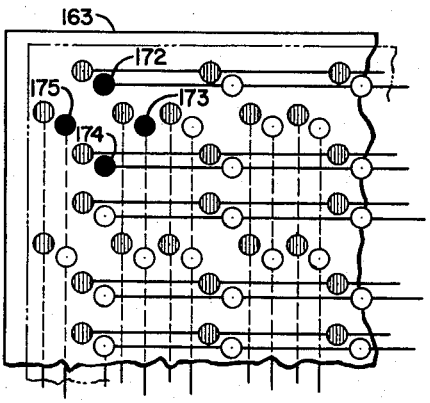

Fig. 17 is an enlarged fragmentary plan view of the printed contact board in the shifted position.

Figure 18:
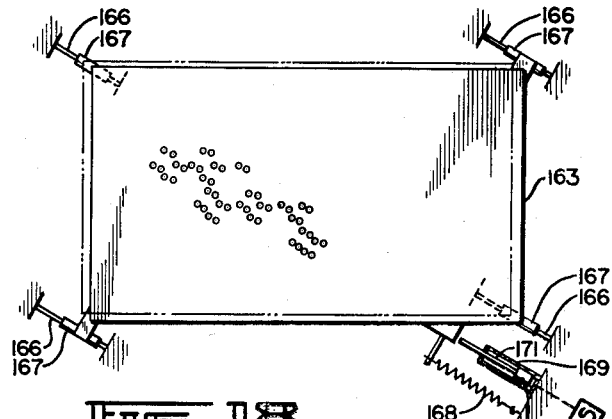

Fig. 18 is a plan view of the printed contact board and its shifting means.

Figure 19:
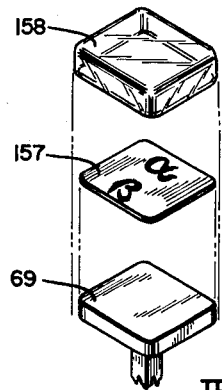

Fig. 19 is an enlarged perspective view of the cap assembly for a keybutton.

Fig. 20 is an enlarged plan view of the carriage.

Fig. 21 is an enlarged sectional view of the carriage and its actuating cylinder taken along the line 21—21 in Fig. 20.

Figure 22:
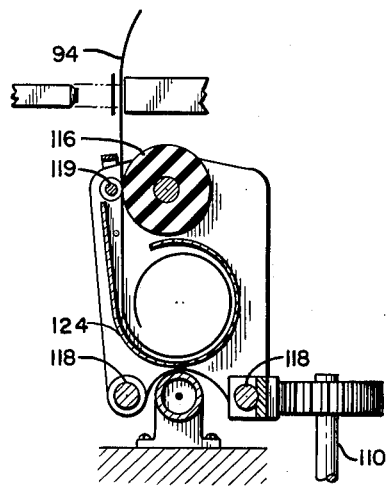

Fig. 22 is an enlarged sectional view of the carriage taken along the line 22—22 in Fig. 20.

Figure 23:
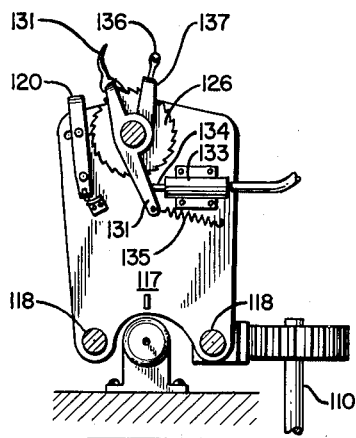

Fig. 23 is an enlarged sectional view of the roller actuating device taken along the line 23—23 in Fig. 20.

Figure 24:
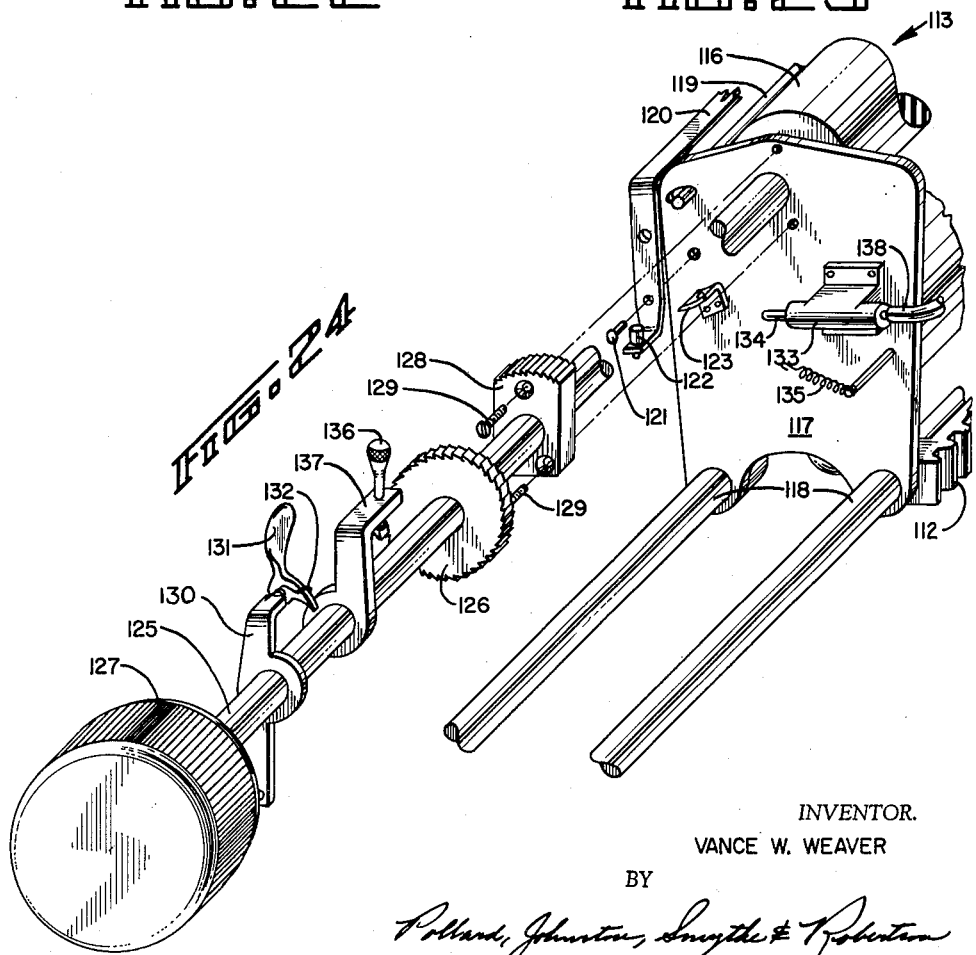

Fig. 24 is an exploded perspective view of the ratchet device for the paper roller.

Fig. 25 is a schematic representation of the pneumatic and electrical circuitry for the typing machine.

The type impression is applied to the receiving surface by means of typestick 30 (Fig. 4). Typestick 30 may include shell 31 which is attached to stud 32, by threaded connection 33. Stop collar 34, biased by spring 35, is slidably mounted with respect to stud 32. Lock nut 36, mounted on thread 37, locates the limit position of stop collar 34 and locks it to stud 32. Cap 38 is mounted on threaded stud 32 and is secured by lock nut 39. Typesticks 30 are normally arranged within compartments 40 of type case 41 (Fig. 3). Studs 32 of typesticks 30 pass through insulating bushings 42 which are inserted through openings 43 in wall 44 at the front of type case 41. Conductive surface 45 is attached to wall 44.

Shell 31 (Fig. 5) receives type slug 46 within opening 47. Ridge 48 within shell 31 engages nick 49 of type slug 46 so as to lock it in place within shell 31. Since opening 43 is of a standard size for all typesticks 30, spacer slugs 50 may be used to fill opening 43 whenever type slug 46 has insufficient width to fill opening 43. The open end 51 of shell 31 may be provided with tapered surfaces 52 sloping toward opening 47 of shell 31. Typesticks 30 disposed within compartments 40 of type case 41 are biased by springs 35 so that shells 31 are held against the inner surface of wall 44. In this manner type faces 53 of all type slugs 46 are held in substantially the same plane, parallel to the open side of type case 41.

In operation, type case 41 is positioned with respect to a printing point so that a slug typestick may be actuated to make an impression on the receiving surface. Type case 41 is positioned with respect to the printing point by means of vertical locating cylinder 55 (Fig. 12). The printing point is defined by the intersection of a line coincident with the path of travel of hammer 91 with platen 57 (Fig. 7). To permit horizontal movement of vertical locating cylinder 55, it is supported by arms 58 to which are attached rollers 59, riding on tracks 60. Horizontal locating cylinder 54 (Fig. 12) is mounted on the frame of the machine (not shown). Piston 61 within horizontal locating cylinder 54 is attached to piston rod 62, which is threadably connected to vertical locating cylinder 55. Lock nut 63 secures the connection of piston rod 62 to vertical locating cylinder 56.

The extent of travel of piston 61 within horizontal locating cylinder 54 is determined by the interaction of selecting pin units 64 (Fig. 10) located in an axial manner along cylinder 54. Location 65, within cylinder 54, is the rest position for piston 61. The interaction of selecting pin units 64 and piston 61 limits the travel of piston 61 within cylinder 54 so as to define the horizontal position of vertical locating cylinder 55. Type case 41 is attached to piston rod 66 of vertical locating cylinder 55 (Fig. 9). As with horizontal locating cylinder 54, the travel of piston 67, attached to piston rod 66, within vertical locating cylinder 55 will be defined by the interaction of selecting pins 64 and piston 67. Piston 67 has a rest position at location 68, adjacent to the bottom of vertical locating cylinder 55.

Figure 1:
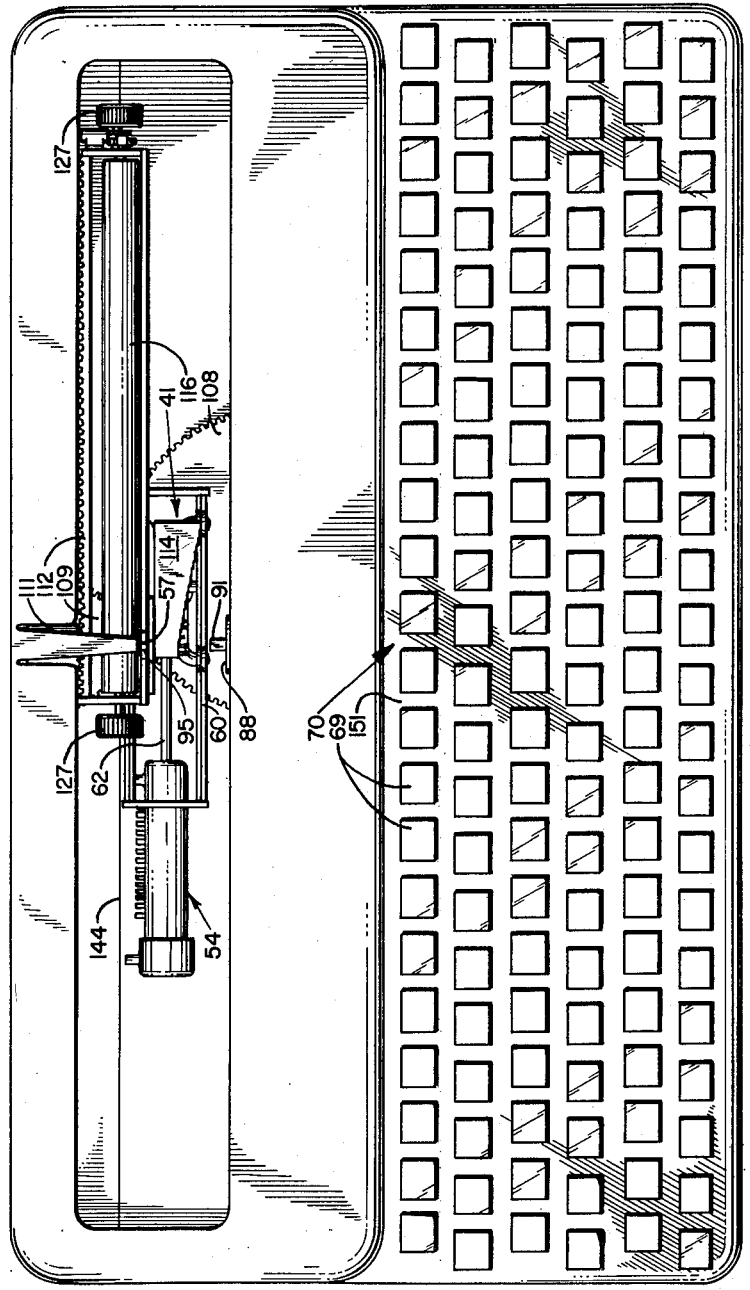
Fig. 1 is a plan view of the typing machine.
Figure 2:
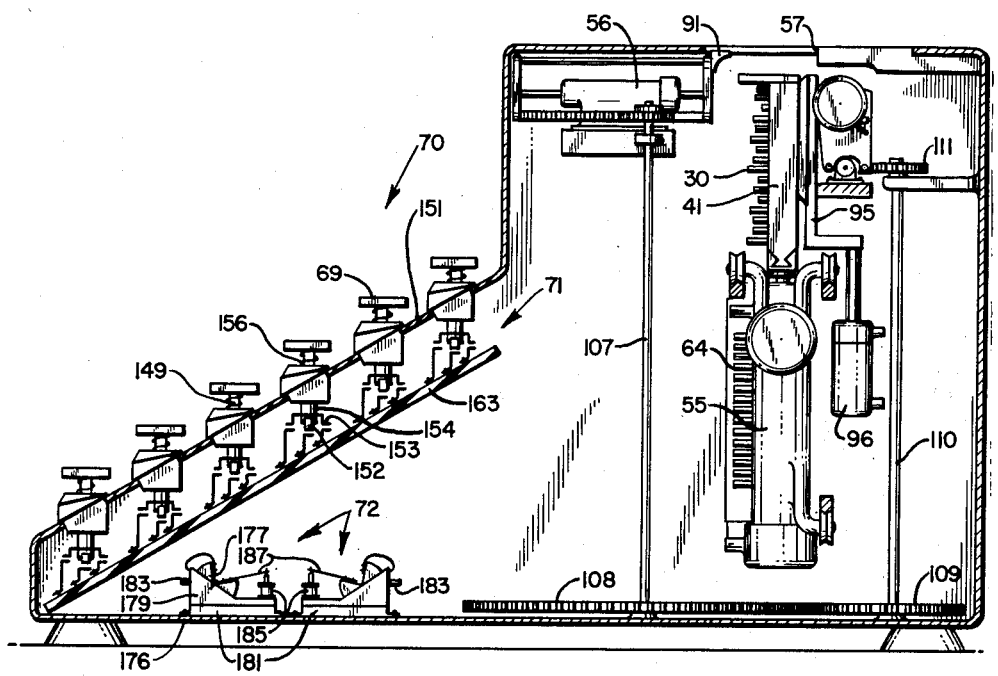
Fig. 2 is a sectional elevational view of the typing machine.

The pressing of keybutton 69 in keyboard 70 (Fig. 2) closes contacts 71 so as to energize a pair of solenoid valves 72. Each of the pair of solenoid valves 72 (Figs. 13 and 14) connects a compressed air supply to the selecting pin units 64 of locating cylinders 54 and 55. The compressed air is delivered to the selecting pin units 64 through pipe 73, attached to the metal body 74, of the selecting pin units 64. The metal body 74 is attached to an insulating base 75 which is mounted within opening 76 in the wall of the locating cylinders 54 and 55. The selecting pin unit 64 (Fig. 10) contains selecting pin 77 attached to piston 78 and biased by spring 79. The application of the air pressure to piston 78 will force selecting pin 77 against spring 79 so that selecting pin 77 extends within the cylinder. Insulating base 75 is provided with a pair of contacts 80 which extend through its wall so that upon the movement of selecting pin 77 into the locating cylinders, piston 78 will rest against contacts 80, thereby closing an electric circuit.

As shown in Fig. 12, selecting pin unit 64 has been operated and compressed air has been applied to horizontal locating cylinder 54 through passage 81 so that piston 61 has been moved until it comes to rest against the extended selecting pin 77. Passage 82 serves to vent horizontal locating cylinder 54 during this operation. With piston 61 resting against the extended selecting pin 77 it is evident that type case 41 is accurately positioned and held in the horizontal direction so that a selected typestick 30 is aligned with the path of travel of hammer 91. Vertical locating cylinder 55 (Fig. 9) is operated in a similar manner, following the depression of keybutton 69 on keyboard 70. The selecting pin unit 64 is actuated and compressed air is delivered through passage 83 so as to elevate piston 67 against an extended selecting pin 77. Vertical locating cylinder 55 is vented during this operation through passage 84.

With type case 41 positioned so as to align the selected typestick 30 at the printing point which is in line with the path of travel of hammer 91 and platen 57 (Fig. 7), compressed air is delivered to hammer cylinder 56 through passage 85, to force piston 86 and piston rod 87 in the direction of type case 41. Piston rod 87 is connected to plates 88 and 89, which are spaced by tie rods 90. Hammer 91 is mounted on plate 88 and extends toward type case 41. During the advancing stroke of hammer piston 86, hammer cylinder 56 is vented through passage 92. During the stroke of hammer cylinder 56, hammer 91 contacts cap 38 of typestick 30 and advances typestick 30 until the type face 53 of type slug 46 strikes receiving surface of paper 94 (Fig. 9). Platen 57 supports paper 94 while the impression is made.

Before typestick 30 is extended from type case 41 by the action of hammer 91 centering plate 95 is elevated by centering plate cylinder 96 until centering plate window 97 is aligned with the type point at platen 57. Passages 98 and 99 of centering plate cylinder 86 form its pneumatic circuit. Centering plate 95 which contacts the rear surface 100 of type cast 41 is supported in vertical guides 101. In this manner type case 41 is restrained from any lateral motion during the action of hammer 91 with respect to typestick 30 (Fig. 9). As hammer 91 contacts cap 38 typestick 30 is advanced from type case 41 and tapered surfaces 52 on shell 31 enter into tapered surface 102 on window 97. Thus, window 97 supports and aligns typestick 30 with respect to platen 57 whenever typestick 30 is advanced from type case 41.

Rack 103 (Fig. 7) attached to plates 88 and 89 is engaged with gear 104, to which is attached ratchet 105. Ratchet wheel 106 in contact with ratchet 105 is attached to shaft 107 (Fig. 9). Gear 108, mounted on shaft 107, drives gear 109, mounted on shaft 110. Gear 111 mounted on shaft 110 is meshed with carriage rack 112 of carriage 113 (Figs. 20 and 24). When hammer 91 is advanced toward the selected typestick 30, rack 103 drives gear 104 in a direction such that ratchet 105 slips with respect to ratchet wheel 106. Thus, during the advanced stroke of hammer 91 no motion is transmitted to gears 108 and 109. Upon the return stroke of hammer 91 from in contact with typestick 30, rack 103 rotates gear 104 so that ratchet 105 locks in mesh with the teeth of ratchet wheel 106. In turn, ratchet wheel 106 drives gear 108 and gear 109 drives gear 111 in mesh with carriage rack 112. In this manner the carriage rack spaces carriage 113 so that the next type impression may be made upon receiving surface 94.

Control of the length of the stroke of hammer cylinder 56 determines the magnitude of movement of carriage 113 and consequently the spacing of the impressed characters along paper 94. Typestick 30 (Fig. 4) is the means of controlling the stroke of hammer cylinder 56. The position of cap 38 along stud 32 of typestick 30 determines the spacing between hammer 91 in its rest position and cap 38 when typestick 30 is held within type case 41. Increasing the space between hammer 91 and cap 38 requires a greater length of stroke for hammer cylinder 56 in order to advance typestick 30 into contact with receiving surface 94. Thus, the magnitude of the stroke may be accurately determined by the proper position of cap 38 with respect to stud 32. Cap 38 may be made available in different lengths to provide the spacing adjustment without the need for the threaded adjustment of cap 38 on stud 32. The spacing adjustment is individually made for each typestick 30 so that the resulting spacing conforms to the width of the character of type face 53 on type slug 46. Thus, for example, caps 38 are selected to set a very close space with respect to hammer 91 for typesticks containing punctuation marks or other small characters. After striking such a character, carriage 113 would be spaced for a minimum amount.

Stop collar 34, which is located along stud 32 by the positioning of lock nut 39, serves to limit the extent of movement of typestick 30 with respect to type case 41. Since stop collar 34 limits the movement of the typestick 30 with respect to type case 41, it controls the weight of impression of the printed character on paper 94. Stop collar 34 is positioned on stud 32 by lock nut 39 and may be adjusted for a range of impression weights.

Plate 114 (Fig. 3) at the top of type case 41 is provided with steps 115 adjacent to the front side of type case 41. In order to obtain a pre-selected space of carriage 113, a spacing key on keyboard 70 is depressed and type case 41 is positioned with respect to the printing point so that hammer 91 is in line with a particular one of steps 115. Since steps 115 are at varying distances from hammer 91, each step upon actuating hammer 91 against it, will effect a pre-determined spacing for carriage 113. A plurality of spacing keys is required in keyboard 70 in order to permit the selection of the number of available spacing adjustments provided by steps 115.

Carriage 113 (Fig. 24) comprises roller 116 mounted on end-plates 117, which are slidably mounted on rods 118. Carriage 113 is provided with idler roller 119 pivotally mounted in end-plates 117 and proximate to roller 116. Frame 120 which holds paper 94 against roller 116 is pivotally attached to end-plates 117 by pins 121 and is locked by detents 122 interacting with seats 123 attached to end-plates 117. Carriage 113 is additionally provided with basket 124 (Fig. 22) supporting paper 94 so that it may pass between roller 116 and idler roller 119.

Ratchet wheel 126 (Fig. 24) and operating knob 127 are attached to supporting shaft 125 of roller 116. Sector rack 128 is mounted on end-plate 117 proximate to supporting shaft 125 and is secured in place by screws 129. Lever 130 on which is pivotally mounted leading pawl 131 is freely mounted on supporting shaft 125. In the assembled condition leading pawl 131 is biased by spring 132 so as to engage the teeth of ratchet wheel 126. Leading cylinder 133 is mounted in end-plate 117. Piston rod 134 of leading cylinder 133 is pivotally connected to lever 130 which is biased by spring 135. Leading stop 136 (Fig. 23) which is spring biased toward support 137 is freely mounted on support shaft 125. Leading stop 136 may be engaged at a pre-determined position along sector rack 128 so as to limit the travel of leading pawl 131 when actuated by piston rod 134 of leading cylinder 133. Compressed air is delivered to leading cylinder 133 from a solenoid valve by hose 138. The machine operator by disengaging leading pawl 131 and grasping operating knob 137 may rotate roller 116 in order to insert paper 94 and make any required adjustments. The operator, by positioning leading stop 136 on sector rack 128, sets the magnitude of rotation of roller 116 and consequently the interlinear spacing that will be provided by roller 116 upon each actuation of leading cylinder 133.

Figure 11:
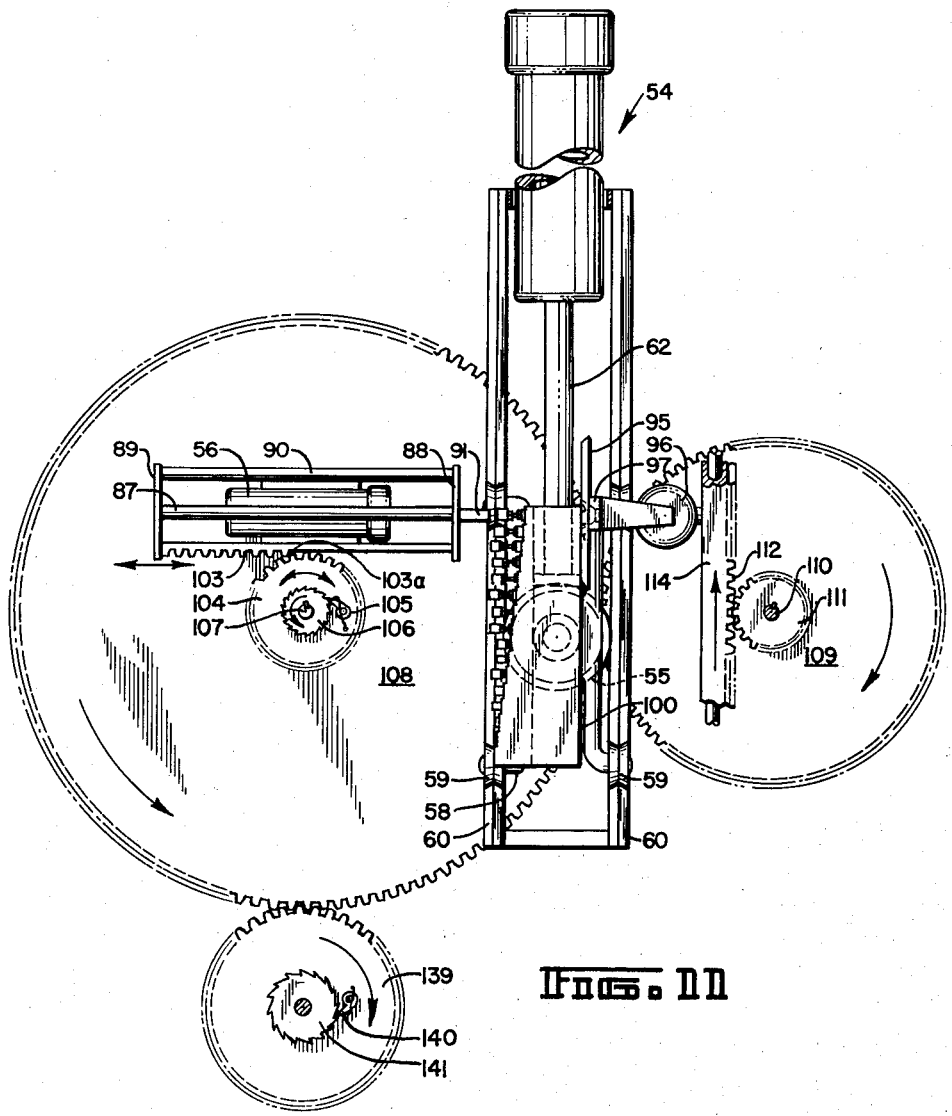
Fig. 11 is an enlarged sectional view of the drive to the carriage taken along line 11—11 of Fig. 9.

During operation of the machine the typing ribbon (not shown) is driven by means of a ribbon travel gear 139 (Fig. 11) which is engaged with gear 108. Gear 139 drives ratchet 140 and ratchet wheel 141 during the return stroke of hammer cylinder 56 only. Carriage 113 (Fig. 21) is returned by means of actuating cylinder 142, piston 143 and cable 144. Compressed air may be admitted to actuating cylinder 142 through passage 145 so as to drive piston 143. Passage 146, during the return motion, vents the actuating cylinder 142. Cable 144 is routed over pulleys 147 and 148 (Fig. 20) and is connected to end-plates 117. In order to drive carriage 113 in the opposite direction to that of the return motion, compressed air may be applied to passage 146 with passage 145 serving as a vent. Since carriage rack 114 is constantly in mesh with gear 111 (Fig. 20) the gear train, including gears 108 and 109, is driven in a reverse manner during the return motion of carriage 113. To prevent this return motion from driving rack 103 of hammer cylinder 56, the teeth of rack 103 are relieved at location 103a so that rack 103 is disengaged from gear 104 whenever hammer piston 86 is fully retracted. Consequently the reverse motion of the gear drive during the return motion of carriage 113 will not effect motion of rack 103. During the return of carriage 113, gear 139 will rotate in a direction such that ratchet 140 will slip with respect to ratchet wheel 141 so that the ribbon will not be driven backwards.

Keybuttons 69 (Figs. 2 and 15) are attached to shafts 149 of insulating material which are piloted by bushings 150. Bushings 150 are mounted in openings in support plate 151. Contacts 71 comprising contact strips 152 and 153 are attached to shaft 149 by insulating spacer 154 and screw 155. Contact strips 152 and 153 are mounted on shaft 149 at right angles to one another. Spring 156 serves to bias keybuttons 69 and shaft 149 in an upward direction. Keybuttons 69 are identified by cards 157 which are enclosed by transparent caps 158 (Fig. 19).

Upon depression of keybutton 69 contact strips 152 and 153 engage contact strips 159, 160, 161 and 162 which are attached to printed contact board 163 at terminals 159a, 160a, 161a, and 162a, respectively. Upon depression of keybutton 69 contact strips 152 connect contact 159 to contact 161. At the same time contact strip 153 connects contact 160 to contact 162. The contacts on printed contact board 163 serve to energize two channels of electrical circuitry which control the solenoid valves for the locating cylinders and additional elements of the typing machine. Fig. 16 shows the contact board in its standard position and indicates the available terminals for this position by darkened terminals 159a through 162a and by the shaded terminals 159b through 162b, etc. Contacts 159a, 159b and 159c are shown connected to a common line 164 and contacts 161a, 161b and 161c are shown connected to a common line 165. Common lines 164 and 165 serve to activate a single selecting pin unit 64 for one of the locating cylinders 54 and 55, since a single selecting pin unit 64 will serve to control type case 41 in one axis for the entire column of typesticks 30 in type case 41. Thus, for example, all typesticks in a vertical column are selected by a single selecting pin unit 64 in the horizontal locating cylinder 54 and the entire range of selecting pin units 64 in the vertical locating cylinder 55.

In order that a single keybutton 69 may control more than one typestick 30, means are provided to shift printed contact board 163 to an alternate position (Fig. 17). Printed contact board 163 is supported with respect to the frame of the typing machine by rods 166 upon which are installed bearings 167 attached to printed contact board 163. Spring 168 holds contact board 163 in the standard position. Cylinder 169 containing piston 170 attached to piston rod 171 moves contact board 163 to the alternate position.

Fig. 17 shows printed contact board 103 after it has been shifted to the alternate position. The alternate position is indicated by darkened terminals 172, 173, 174 and 175 as well as the unshaded terminals, while the contacts corresponding to the standard position are shown by shaded terminals. It is evident that upon depressing keybutton 69 with printed contact board 163 shifted into the alternate position, contact strip 152 will connect terminals 172 to terminals 174 and contact strip 153 will connect terminals 173 to terminals 175. Contacts 171 through 175 are connected by means of the printed circuitry of printed contact board 163 to the solenoid valves controlling the locating cylinders for the other elements of the typing machine. Card 157 of keybutton 69 is identified with the character which may be impressed by either position of printed contact board 163.

Solenoid valves 72 may be placed on the base 176 (Fig. 2) of the typing machine beneath contact board 163. Solenoid valves 72 comprise rotor 177 containing passage 178 and are mounted within valve body 179. Passage 180 in the valve base 181 is connected to supply passage 182 which communicates with rotor 177. Outlet passages 183 may be connected to selecting pin units 64 and other pneumatic elements in the typing machine. Rotor 177 is biased by spring 184 into a position wherein rotor 177 blocks passages 182 and 183. Valve rotor 177 is actuated by solenoid 185 having core 186 connected to rotor arm 187 by link 188. Upon energizing solenoid 185 core 186 is moved thereby rotating rotor 177 to a position where passage 178 connects supply passage 182 to outlet passage 183. Solenoid valves 72 are arranged on base 176 adjacent to one another (Fig. 13). With this arrangement passages 180 of each valve base 181 are aligned with one another so as to form a common air passage or manifold. Pipe 189 (Fig. 13) furnishes compressed air to this common supply passage. For the case where it is required to vent the pneumatic element connected to solenoid valve 72 to the atmosphere, solenoid valve 72 may be provided with a vent passage 191 leading from valve rotor 177 to the atmosphere. In the de-energized condition vent passage 191 of rotor 177 connects outlet passage 183 to the atmosphere so as to vent the pneumatic element. In the energized condition, vent passage 191 is closed by valve body 179.

The pneumatic and electrical circuit diagram for the typing machine is shown in Fig. 25. Upon depressing keybutton 69 contact strip 152 connects line 192 to solenoid 193. Line 192 is connected through normally closed switch 194 to power supply 195. Solenoid 193 upon being energized actuates valve 194 which connects compressed air supply 196 through pipe 73 to selecting pin unit 64. The compressed air acts upon piston 78 so as to project selecting pin 77 into the vertical locating cylinder 55. Solenoid 193 may be provided with a self-holding coil (not shown) which is energized by line 197 after the solenoid has been actuated. With the self-holding provision solenoid 193 remains actuated following release of keybutton 69. Piston 78 having been advanced toward vertical locating cylinder 55, connects contacts 80 so as to complete a circuit from line 198 through contacts 80 and piston 78, to solenoid 201 and to the ground connection. The energizing of solenoid 201 actuates valve 203 so as to connect air supply 196 to passage 83 and to vertical locating cylinder 55. The connecting of contacts 80 by piston 78 insures that locating pin 77 is extended into cylinder 55. The compressed air entering through passage 83 elevates piston 67 until the piston is stopped by hitting extended locating pin 77. In this manner type case 41 is elevated to a pre-selected position determined by the selected keybutton 69. The contact of piston 67 with extended selecting pin 77 completes a circuit from line 204, through solenoid 199, line 200, contacts 80, piston 78, selecting pin 77, piston 67, and to the grounded cylinder 55.

The depresion of keybutton 69 closes contact strip 153 which connects line 205 through switch 194 to the power supply 195. Solenoid 206 is energized through line 204 and its self-holding coil (not shown), after actuation of solenoid 206, maintains solenoid 206 energized by means of the connection through line 207 to line 205. The energized solenoid 206 activates valve 208 which connects air supply 196 to selecting pin unit 64a. Piston 78a and selecting pin 77a are advanced and piston 78a then completes the circuit through contacts 80a. Contacts 80a connect line 209 to solenoid 210 which is provided with a self-holding coil (not shown), energized from line 211. Solenoid 210 actuates valve 212 which connects air supply 196 through pipe 213 to passage 81 and horizontal locating cylinder 54. Passage of compressed air through passage 81 into horizontal locating cylinder 54 moves piston 61 and piston rod 62 until piston 61 hits extended selecting pin 77a. This contact serves to position type case 41 in the horizontal direction as dictated by the selection of the proper keybutton 69.

Contact of piston 61 with locating pin 77a completes the circuit through line 214, solenoid 215, selecting pin 77a and piston 61 to ground. Solenoid 215 actuates normally open switch 216 which is in series with normally open switch 202 connected to line 204. The closing of switches 202 and 216 energizes solenoid 217 through line 218 and normally closed switch 219. It is evident that the closing of switches 202 and 216 are proof that, with type case 41 moved to a predetermined position as determined by the depressed keybutton 69, the typestick 30 is ready to be advanced against paper 94. Centering plate 97 is elevated by the action of valve 220, controlled by solenoid 221 which may be energized through the circuit completed by piston 78a and contacts 80a. Thus, window 97 is placed in alignment with plate 57 before typestick 30 is advanced.

The energized solenoid 217 actuates valve 222 so as to move hammer piston 86 and hammer 91. Contact of hammer 91 with typestick 30 advances typestick 30 to impress paper 94 at which time stop collar 34, mounted upon stud 32, strikes conducting surface 45 on wall 44 of type case 41. Conducting surface 45 is connected by line lead 223 to power supply 195. With hammer 91 in contact with cap 38 of typestick 30 and with stop collar 34 in contact with conducting surface 45, a circuit is complete from power supply 195 through line 224, solenoids 225 and 226, to ground.

Energized solenoid 226 opens normally closed switch 219 in order to de-energize solenoid 217 and to open valve 222 to its venting condition. The energized solenoid 225 actuates valve 225a and connects air supply 196 through pipe 227 to hammer cylinder 56 in order to return piston 86 to its retracted position. Once actuated solenoids 225 and 226 are held by self-holding coils (not shown) connected to line 228. With piston 86 in its retracted position, the end of piston rod 87 closes normally open switch 229 which connects power supply 195 through line 231a, normally closed switch 231, and line 232 to energize solenoid 233.

Energized solenoid 233 opens normally closed switch 194 which normally connects power supply 195 to lines 192, 204 and 228. The opening of switch 194 serves to initiate the return of the various elements of the typing machine to a rest position so that a subsequent selection of one of the keybuttons 69 may be made by the operator. The opening of switch 194 serves to de-energize lines 192, 204 and 228 which, in turn, de-energizes the self-holding coils (not shown) of solenoids 193, 201, 206 and 210. The release of solenoid 193 permits valve 194 to return to a venting position so that piston 78 and selecting pin 77 may be withdrawn by the action of spring 35. The release of solenoid 201 moves valve 203 to the vent position so that piston 67 of vertical locating cylinder 55 may be returned to its rest position. The release of solenoid 210 moves valve 212 to its vent position so that horizontal locating cylinder 54 may be returned to its rest position. The release of solenoid 206 moves valve 208 to its vent position so that selecting pin 77 may be retracted.

The retraction of selecting pin units 64 and 64a effects the release of solenoids 199 and 215 so that switches 202 and 216 respectively, are returned to their normally open position. This serves to break the circuit from line 204 to line 218. Line 228 being de-energized results in the release of solenoid 225 which moves valve 225a to its vent position. Line 228 being de-energized also releases solenoid 226 so that switch 229 is returned to its normally closed position.

The closure of normally open switch 229 by action of hammer piston rod 87 connects line 234 to line 231 and power supply 195 thereby energizing solenoid 235. Solenoid 235 being energized moves valve 236 and connects air supply 196 to pipes 237 and 238. Pipe 237 applies compressed air through passage 84 of vertical locating cylinder 55 so as to positively lower piston 67 to its rest position. Pipe 238 supplies compressed air through passage 82 of horizontal locating cylinder 54 so as to positively return piston 61 to its rest position. In addition pipe 238 supplies compressed air through passage 98 of centering plate cylinder 99 so as to return centering plate 95 to its rest position.

With vertical locating cylinder 55 in its rest position, normally open position, switch 239 is closed. With horizontal locating cylinder 54 in its rest position, normally open position switch 240 is closed. Switches 239 and 240 being closed complete a circuit through lines 241 and 242 to solenoid 243 which opens normally closed switch 231. Switch 231 being opened, de-energizes line 231a from power supply 195 so that the circuit through closed switch 229 and line 234 to solenoid 235 is opened. In this manner the return of locating cylinders 54 and 55 to their rest position effects termination of the air pressure applied to the locating cylinders by way of valve 236. The opening of switch 231 also de-energizes solenoid 233 so that switch 194 assumes its normally closed position.

In this manner, the electrical and pneumatic circuit is restored to a rest position so that the operator may select another keybutton 69. It should be noted that the position of the electrical and pneumatic circuit is related to the selecting pin units 64 and 64a which control the positioning of locating cylinders 54 and 55 and consequently that of type case 41. This portion of the circuitry which includes solenoid 193, valve 94, selecting pin unit 64, solenoid 206, valve 208 and selecting pin unit 64a, has been enclosed with dash lines. The enclosure within dash lines is to emphasize that this portion of the circuitry is repeated a number of times within the typing machine. The remaining portions of the electrical and pneumatic circuitry perform functions of a dissimilar nature and consequently there is no requirement for a plurality of these units.

Operation

The typing machine is suited to printing matter in which a great range and variety of characters are required. For example, in the preparation of technical reports or specifications a great variety of characters, symbols, Greek letters, and figures peculiar to some area of engineering or science are often required. In the operation of the typing machine, type case 41 would be filled with type slugs 46 having the necessary characters. Type case 41 is equipped with sufficient capacity to accommodate a large variety of characters. If necessary, the type slugs in type case 41 may be changed in part due to its compartmented construction.

The receiving surface 94, which may be paper, duplicating masters, or any surface suitable for printing is inserted into basket 124 and advanced to the printing position by roller 116 and idler 119. For this operation keybutton 69 of keyboard 70 is used to activate leading cylinder 133 which operates roller 116. Paper 94 when advanced to the printing position, overlies platen 57. The operator then shifts carriage 113 so that paper 94 is positioned to the proper margin location. In this case, depressing a predetermined keybutton 69 activates cylinder 143 to move carriage 113 to the margin location by the action of cable 144.

At this point the operator may begin to type the required matter on to paper 94. Centering plate 95 in its rest position is depressed by the action of centering plate cylinder 96 so that the printing position on paper 94 in line with platen 57 is visible to the operator. Between printing strokes of the machine the operator may view the entire line currently being printtd which extends through the printed point. Upon depressing keybutton 69 to impress a character upon paper 94, contacts 71 abut one another, so as to energize electrical and pneumatic circuitry shown in Fig. 25. The closed contacts 71 complete the circuitry through printed circuit board 163 to advance selecting pin units 64a and 64 into the horizontal and vertical locating cylinders 54 and 55, respectively. The advance of pistons 78 and 78a of the selecting pin units closes off contacts 80 and 80a which operate solenoid valves 201 and 212 to apply compressed air to the locating cylinders. Pistons 61 and 67 of the locating cylinders are moved until they are stopped by the advanced selecting pins 64a and 64. In this manner, type case 41 is positioned so as to align the selected typestick 30 with hammer 91 and platen 57. At the same time, window 97 in centering plate 95 is elevated so as to be aligned with selected typestick 30. The contact of selecting pistons 61 and 67 with their respective advanced selecting pins completes a circuit to solenoid 217 which controls valve 222 connecting the compressed air to hammer cylinder 56. The stroke of piston 86 and hammer 91 results in advancing type face 53 of the selected typestick 30 against paper 94.

Upon the striking of cap 38 by hammer 91, shell 31 containing type slug 46 is advanced toward paper 94 until its forward motion is arrested by the contact of stop collar 34 upon conductive surface 45 of type case 41. Window 97 in centering plate 95 positions typestick 30 during this motion. The position of stop collar 34 along stud 32 controls the amount of travel of shell 31 with respect to type case 41 and consequently controls the weight of impresison of type face 53 on paper 94. The clearance between hammer 91 in its rest position and cap 38 is determined by the location of cap 38 along stud 32, or by the length of cap 38 itself. This clearance contributes to the total travel of hammer 91 during the impression stroke. For all typesticks 30 the stroke of hammer 91 is determined at the point at which stop collar 34 comes to rest against condutive surface 45. It is therefore evident that increasing the clearance between hammer 91 and cap 38 will result in a longer stroke for hammer 91 during its operating cycle.

During the advance of hammer 91, rack 103 attached to plates 88 and 89, is moved forward beyond the location 103a having relieved teeth so as to rotate gear 104. Ratchet 105, pivotally attached to gear 104, slips along ratchet wheel 106. Upon the return stroke of piston 86 rack 103 drives gear 104 causing ratchet 105 to engage with ratchet wheel 106. Gear 108 drives gear 109 and gear 111 which is engaged with rack 112 attached to carriage 113. Carriage 113 is thereby spaced to an extent determined by the stroke of piston 86 during its return motion. By the adjustment of cap 38 along stud 32 or by the selection of a pre-determined length for cap 38, the travel of piston 86 is controlled and thus spacing of carriage 113 is determined. This adjustment would be made for each typestick 30 depending upon the width of its type face 53.

Contact of stop collar 34 with conductive surface 45 completes a circuit to energize solenoids 225 and 226 which initiate the return of hammer piston 86 to its rest position. Once hammer piston 86 has returned, the remaining elements of the typing machine may be restored to their rest condition so that a subsequent selection of keybutton 69 may be made by the operator. The retraction of hammer 91 permits spring 35 to return typestick 30 to its rest position within type case 41.

The retraction of hammer piston 86 results in piston rod 87 closing normally open switch 229 which energizes solenoid 235. Solenoid 235 operates valve 236 which applies compressed air to selecting cylinders 54 and 55 and to centering plate 95 so as to return these cylinders to their rest position. The closure of normally open switch 229 also energizes solenoid 233 thereby opening normally closed switch 194 which serves to open the connection of lines 192, 204 and 228 to power source 195. The de-energizing of these lines causes the solenoids associated with the selecting pin units 64 and 64a and the air valves 203 and 212, as well as solenoid 221, controlling valve 222 of centering plate 95 to be returned to their rest condition. The return of type case 41 to its rest position causes the closure of switches 239 and 240 which complete a circuit through solenoid 243 thereby opening normally closed switch 231. The opening of switch 231 de-energizes solenoid 235 which returns valve 236 to its vent position. In this manner the entire electrical and pneumatic circuitry are returned to a rest condition in readiness for subsequent selection of a keybutton 69.

In order that keybutton 69 may control more than a single typestick, printed contact board 163 may be provided with several complete sets of contacts such as 159a through 162a, etc. and 172 through 175, etc. One set of terminals is positioned at a time to be aligned with contact strips 152 and 153 of keybuttons 69. The shifting of printed board 163 by piston 170 from its standard to alternate position brings the other set of terminals into alignment with contact strips 152 and 153. In this way, each keybutton 69 may control more than one typestick 30 so as to accommodate, for example, the upper and lower case of the alphabet letters. The capability of one keybutton 69 to control more than one typestick 30 also serves to reduce the number of keybuttons thereby simplifying operation of the typing machine.

The terms and expressions which I have employed are used in a descriptive and not a limiting sense and there is not intention of excluding such equivalents of the invention described or of portions thereof as fall within the purview of the claims.

I claim:

1. A machine for producing lines of type face characters upon a receiving surface including control means for selecting a character to be impressed, a plurality of type members, a movable type case carrying said type members, means for positioning said type case to bring selected type members individually to printing position, means for striking the type members to impress a series of characters on said receiving surface, means for producing linear movement of said receiving surface in response to the extent of travel of said striking means, and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means.

2. A machine in accordance with claim 1 in which said type members include type slugs and resilient means urging said type slugs within said type case.

3. A machine in accordance with claim 1 in which said type members include housing members open at one end, type slugs having type faces disposed within said housing members, with said type faces exposed, and resilient means urging said housing members within said type case.

4. A machine in accordance with claim 1 in which said means for controlling the extent of linear movement of said receiving surface through the individual type members to produce variable predetermined spacings includes spacer elements of predetermined length associated with the respective individual type members, said length being a function of the required spacing, said spacer elements being disposed with clearance between said striking means and said type members, and gearing means transmitting the motion of said striking means during its return from contact with said type members to said means for producing linear movement of said receiving surface, the length of the motion of said striking means being directly proportional to said clearance of said spacer means.

5. A machine in accordance with claim 1 in which said means for producing linear movement of said receiving surface includes gearing means operable in response to the motion of said means for controlling the extent of linear movement of said receiving surface, carriage means supporting said receiving surface, said carriage means being moved by said gearing means so as to produce lines of type face characters on said receiving surface, and actuating means for returning said carriage means to a margin position upon completion of a line.

6. A machine in accordance with claim 1 in which said means for striking the type members to impress a series of characters or said receiving surface includes a hammer member, and actuating means connected to said hammer means, said hammer having a path of travel aligned with said printing position, whereby said striking means moves said spacer element and said selected type member to impress a character on said receiving surface.

7. A machine in accordance with claim 1, having type members including type slugs and resilient means urging said type slugs within said type case in which said spacer elements associated with the respective individual type members have different lengths to predetermine the extent of travel of said striking means.

8. An actuating device including a cylinder having a plurality of openings disposed along its length, a piston within said cylinder, fluid pressure means for moving said piston, pin members slidably mounted in said openings, means for projecting a selected pin member into the interior of said cylinder, whereby the position of said piston is determined by striking said projected pin member, and means in circuit with said piston and pin members being electrically responsive to the contact of said piston with said pin members.

9. A device for controlling external circuits including a keyboard having keys, contacts attached to said keys, a circuit board underlying said keyboard having a set of terminals connected to external circuits, said terminals being in alignment with the path of travel of said contacts, additional sets of terminals on said circuit board connected to additional external circuits, said additional terminals being displaced in a diagonal direction from said set of terminals and connected to external circuits, and actuating means attached to said terminal board, said actuating means positioning said terminal board to align each of said additional sets of terminals with said contacts, whereby said key contacts may be adapted to abut with said set of terminals and said additional sets of terminals to control said external circuits.

10. A machine for producing lines of type face characters upon a receiving surface including control means for selecting a character to be impressed, a plurality of type members, a movable type case carrying said type members, means for positioning said type case to bring selected type members individually to printing position, means for striking the type members to impress a series of characters on said receiving surface, means for positioning said type members when moved by said striking means, means for removing said means for positioning said type members from adjacent said printing position in the interval between the impressing of said characters, means for producing linear movement of said receiving surface in response to the extent of travel of said striking means, and means for controlling the extent of said movement through the individual type members to produce variable predetermined spacing, said means including spacer elements attached to said type members, said spacer elements being arranged between the type members and the striking means to predetermine the extent of travel of the striking means.

11. A machine in accordance with claim 10 in which said means for positioning said type members when moved by said striking means includes a support plate located between said type case and said receiving surface, said support plate having an aperture aligned with said selected type member at said printing position, said selected type member passing through said aperture upon being moved by said striking means, whereby said type member is positioned.

12. A machine in accordance with claim 10 in which said type members include type slugs and resilient means urging said type slugs within said type case.

13. A machine in accordance with claim 10 in which said type members include housing members open at one end, type slugs having type faces disposed within said housing members, with said type faces exposed, and resilient means urging said housing members within said type case.

14. A machine in accordance with claim 10 in which said means for controlling the extent of linear movement of said receiving surface through the individual type members to produce variable predetermined spacings includes spacer elements of predetermined length associated with the respective individual type members, said length being a function of the required spacing, said spacer elements being disposed with clearance between said striking means and said type members, and gearing means transmitting the motion of said striking means during its return from contact with said type members to said means for producing linear movement of said receiving surface, the length of the motion of said striking means being directly proportional to said clearance of said spacer means.

15. A machine in accordance with claim 10 in which said means for producing linear movement of said receiving surface includes gearing means operable in response to the motion of said means for striking the type members, carriage means supporting said receiving surface, said carriage means being moved by said gearing means so as to produce lines of type face characters on said receiving surface, and actuating means for returning said carriage means to a margin position upon completion of a line.

16. A machine in accordance with claim 10 in which said means for striking the type members to impress a series of characters on said receiving surface includes hammer means, and actuating means connected to said hammer means, said hammer means having a path of travel aligned with said printing position, whereby said striking means moves said spacer element and said selected type member to impress a character on said receiving surface.

17. A machine in accordance with claim 10, having type members including type slugs and resilient means urging said type slugs within said type case, and in which said spacer elements associated with the respective individual type members have different lengths to predetermine the extent of travel of said striking means.

18. A machine for producing lines of type face characters upon a receiving surface including control means for selecting a character to be impressed; a movable type case; a plurality of type members carried by said type case, said type members having type slugs, resilient means urging said type slugs within said type case, and stop means to limit the travel of said type slugs with respect to said type case for controlling the magnitude of impression of said type slugs on said receiving surface; means for positioning said type case to bring selected type members individually to printing position; means for striking the type members to impress a series of characters on said receiving surface; means for producing linear movement of said receiving surface in response to the extent of travel of the striking means; and means for controlling the extent of said movement through the individual type members to produce variable predetermined spacing including spacer elements associated with the respective individual type members, said spacer elements being arranged between the type members and the striking means with clearance selected to predetermine the extent of travel of the striking means.

19. A machine for producing lines of type face characters upon a receiving surface including control means for selecting a character to be impressed; a plurality of type members including housing members open at one end, type slugs having type faces disposed within said housing members with said type faces exposed, studs attached to said housing members opposite said open end, stop members attached to said studs, and resilient means mounted on said studs between said stop members and said housing members; a movable type case carrying said type members, said type case comprising a housing having an open side, said housing having inner walls forming compartments uncovered at said open side, and the side opposite said open side having openings through which said studs extend, said resilient means and said stop members being outside of said side having openings; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means; whereby said spacer elements being struck by said striking means, actuate said studs and said stop members attached thereto, said stop members upon contacting the outside of said side having openings, limiting the magnitude of impression of said type faces upon said receiving surface.

20. A machine for producing lines of type face characters upon a receiving surface including control means for selecting a character to be impressed; a plurality of type members including type slugs having type faces at one end, studs attached to the end of said type slugs opposite said type faces, stop members attached to said studs, and resilient means mounted on said studs between said stop members and said type slugs; a movable type care carrying said type members, said type case including a housing having an open side, said housing being divided into compartments uncovered at the open side, and the side opposite said open side having openings through which said studs extend, said resilient means and said stop members being outside of said side having openings; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means; whereby said spacer elements being struck by said striking means, actuate said studs and said stop members attached thereto, said stop members upon contacting the outside of said side having openings, limiting the magnitude of impression of said type faces upon said receiving surface.

21. A machine for producing lines of type face characters upon a receiving surface including control means for selecting a character to be impressed; a plurality of type members having type slugs and studs extending therefrom; a movable type case for carrying said type members, said type case including a housing having side walls, a wall having a plurality of apertures, and inner walls parallel to said side walls and forming cells, said type members being disposed within said cells with said studs extending through said apertures and being adapted for movement in a direction parallel to said side walls of said case; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means.

22. A machine for producing lines of type face characters upon a receiving surface including control means for selecting a character to be impressed; a plurality of type members; a movable type case carrying said type members; means for positioning said type case to bring selected type members individually to printing position including actuating means, said actuating means positioning said type case in two directions at substantially right angles to one another, and a plurality of pin members actuated in response to said control means to limit the motion of said actuating means; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and striking means with clearance selected to predetermine the extent of travel of the striking means.

23. A machine for producing lines of type face characters upon a receiving surface including control means for selecting a character to be impressed; a plurality of type members; a movable type case carrying said type members; means for positioning said type case to bring selected type members individually to printing position including actuating means operated by fluid pressure, said actuating means positioning said type case in two directions at substantially right angles to one another, and a plurality of pin members actuated in response to said control means to limit the motion of said actuating means; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means.

24. A machine for producing lines of type face characters upon a receiving surface including control means for selecting a character to be impressed; a plurality of type members; a movable type case carrying said type members; means for positioning said type case to bring selected type members individually to printing position including an actuating means connected to said type case and operated by fluid pressure, said actuating means moving said type case in one direction, an additional actuating means operated by fluid pressure and connected to said actuating means, said additional actuating means moving said actuating means and said type case in a direction at right angles to said one direction, and a plurality of pin members actuated in response to said control means to limit the motion of said actuating means and said additional actuating means; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means.

25. A machine for producing lines of type face characters upon a receiving surface including control means for selecting a character to be impressed having a keyboard comprising a plurality of keys, movable electrical contacts operated by said keys, and a circuit board having electrical contacts attached thereto, said electrical contacts being in alignment with the path of travel of said movable contacts; a plurality of type members; a movable type case carrying said type members; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means; whereby said movable contacts operated by said keys abut said electrical contacts and complete electrical circuits for controlling said means for positioning said type case.

26. A machine for producing lines of type face characters upon a receiving surface including control means for selecting a character to be impressed having a keyboard comprising a plurality of keys for selecting the character to be impressed, movable electrical contacts operated by said keys, a circuit board having electrical contacts located in alignment with the path of travel of said movable electrical contacts, additional electrical contacts on said circuit board proximate to said contacts, and means for shifting the position of said circuit board to align said additional electrical contacts with said movable electrical contacts; a plurality of type members; a movable type case carrying said type members; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means; whereby said movable electrical contacts operated by said keys abut said electrical contacts and said additional electrical contacts to control said means for positioning said type case.

27. A machine for producing lines of type face characters upon a receiving surface including control means for selecting a character to be impressed having a keyboard comprising a plurality of keys for selecting the character to be impressed, movable electrical contacts operated by said keys, a circuit board having printed circuitry, said circuit board having electrical contacts connected to said printed circuitry and located in alignment with the path of travel of said movable contacts, additional electrical contacts mounted on said circuit board proximate to said electrical contacts and connected to said printed circuitry, and means for shifting the position of said circuit board to align said additional electrical contacts with said movable electrical contacts; a plurality of type members; a movable type case carrying said type members; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members, said spacer elements being arranged between the type members and the striking means with clearance selected to predetermine the extent of travel of the striking means; whereby said movable electrical contacts operated by said keys abut said electrical contacts and said additional electrical contacts to control said means for positioning said type case.

28. A machine for producing lines of type face characters upon a receiving surface including control means for selecting a character to be impressed; a movable type case; a plurality of type members carried by said type case, said type members having type slugs, resilient means urging said type slugs within said type case; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spacer elements associated with the respective individual type members and attached thereto by threads to predetermine the extent of travel of said striking means.

29. A machine for producing lines of type face characters upon a receiving surface including control means for selecting a character to be impressed; a movable type case; a plurality of type members carried by said type case, said type members including housing members open at one end, type slugs having type faces disposed within said housing members with said type faces exposed, studs attached to said housing members opposite said open end, and resilient means urging said housing members within said type case; means for positioning said type case to bring selected type members individually to printing position; means for striking the type members to impress a series of characters on said receiving surface; means for producing linear movement of said receiving surface in response to the extent of travel of said striking means; and means for controlling the extent of said movement through the individual type members to produce variable predetermined spacing, said means including spaced elements attached by threads to said studs to predetermine the extent of travel of said striking means.

30. A machine for producing lines of type face characters upon a receiving surface including control means for selecting a character to be impressed; a plurality of type members; a movable type case carrying said type members; means for positioning said type case to bring selected type members individually to printing position; means for striking the type members to impress a series of characters on said receiving surface; means for positioning said type members when moved by said striking means including a support plate located between said type case and said receiving surface, said support plate having an aperture, and actuating means attached to said support plate, said support plate being positioned by said actuating means before each motion of a selected type member so that said aperture is aligned with said type member at said printing position, said selected type member passing through said aperture upon being moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means.

31. A machine for producing lines of type face characters upon a receiving surface including control means for selecting a character to be impressed; a movable type case; a plurality of type members carried by said type case, said type members having type slugs, resilient means urging said type slugs within said type case, and stop means to limit the travel of said type slugs with respect to said type case to control the magnitude of impression of said type slugs on said receiving surface; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means.

32. A machine for producing lines of type face characters upon a receiving surface including control means for selecting a character to be impressed; a plurality of type members including housing members open at one end, type slugs having type faces disposed within said housing members with said type faces exposed, studs attached to said housing members opposite said open end, stop members attached to said studs, and resilient means mounted on said studs between said stop members and said housing members; a movable type case carrying said type members, said type case comprising a housing having an open side, said housing having inner walls forming compartments uncovered at said open side, and the side opposite said open side having openings through which said studs extend, said resilient means and said stop members being outside of said side having openings; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means; whereby said spacer elements being struck by said striking means, actuate said studs and said stop members attached thereto, said stop members upon contacting the outside of said side having openings, limiting the magnitude of impression of said type faces upon said receiving surface.

33. A machine for producing lines of type face characters upon a receiving surface including control means for selecting a character to be impressed; a plurality of type members including type slugs having type faces at one end, studs attached to the end of said type slugs opposite said type faces, stop members attached to said studs, and resilient means mounted on said studs between said stop members and said type slugs; a movable type case carrying said type members, said type members including a housing having an open side, said housing being divided into compartments uncovered at the open side, and the side opposite said open side having openings through which said studs extend, said resilient means and said stop members being outside of said side having openings; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means; whereby said spacer elements being struck by said striking means, actuate said studs and said stop members attached thereto, said stop members upon contacting the outside of said side having openings, limiting the magnitude of impression of said type faces upon said receiving surface.

34. A machine for producing lines of type face characters upon a receiving surface including control means for selecting a character to be impressed; a plurality of type members having type slugs and studs extending therefrom; a movable type case carrying said type members, said type case including a housing having side walls, a wall having a plurality of apertures, and inner walls parallel to said side walls and forming cells, said type members being disposed within said cells with said studs extending through said apertures, and being adapted for movement in a direction parallel to said side walls of said case; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means.

35. A machine for producing lines of type face characters upon a receiving surface including control means for selecting a character to be impressed; a plurality of type members; a movable type case carrying said type members; means for positioning said type case to bring selected type members individually to printing position including actuating means, said actuating means positioning said type case in two directions at substantially right angles to one another, and a plurality of pin members actuated in response to said control means to limit the motion of said actuating means; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means.

36. A machine for producing lines of type face characters upon a receiving surface including control means for selecting a character to be impressed; a plurality of type members; a movable type case carrying said type members; means for positioning said type case to bring selected type members individually to printing position including actuating means operated by fluid pressure, said actuating means positioning said type case in two directions at substantially right angles to one another, and a plurality of pin members actuated in response to said control means to limit the motion of said actuating means; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means.

37. A machine for producing lines of type face characters upon a receiving surface including control means for selecting a character to be impressed; a plurality of type members; a movable type case carrying said type members; means for positioning said type case to bring selected type members individually to printing position including an actuating means connected to said type case and operated by fluid pressure, said actuating means moving said type case in one direction, an additional actuating means operated by fluid pressure and connected to said actuating means, said additional actuating means moving said actuating means and said type case in a direction at right angles to said one direction, and a plurality of pin members actuated in response to said control means to limit the motion of said actuating and said additional actuating means; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means.

38. A machine for producing lines of type face characters upon a receiving surface including control means for selecting a character to be impressed having a keyboard comprising a plurality of keys, movable electrical contacts operated by said keys, and a circuit board having electrical contacts attached thereto, said electrical contacts being in alignment with the path of travel of said movable contacts; a plurality of type members; a movable type case carrying said type members; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means; whereby said movable contacts operated by said keys abut said electrical contacts and complete electrical circuits for controlling said means for positioning said type case.

39. A machine for producing lines of type face characters upon a receiving surface including control means for selecting a character to be impressed having a keyboard comprising a plurality of keys for selecting the character to be impressed, movable electrical contacts operated by said keys, a circuit board having electrical contacts located in alignment with the path of travel of said movable electrical contacts, additional electrical contacts on said circuit board proximate to said contacts, and means for shifting the position of said circuit board to align said additional electrical contacts with said movable electrical contacts; a plurality of type members; a movable type case carrying said type members; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means; whereby said movable electrical contacts operated by said keys abut said electrical contacts and said additional electrical contacts to control said means for positioning said type case.

40. A machine for producing lines of type face characters upon a receiving surface including control means for selecting a character to be impressed having a keyboard comprising a plurality of keys for selecting the character to be impressed, movable electrical contacts operated by said keys, a circuit board having printed circuitry, said circuit board having electrical contacts connected to said printed circuitry and located in alignment with the path of travel of said movable contacts, additional electrical contacts mounted on said circuit board proximate to said electrical contacts and connected to said printed circuitry, and means for shifting the position of said circuit board to align said additional electrical contacts with said movable electrical contacts; a plurality of type members; a movable type case carrying said type members; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members, said spacer elements being arranged between the type members and the striking means to predetermine the extent of travel of the striking means; whereby said movable electrical contacts operated by said keys abut said electrical contacts and said additional electrical contacts to control said means for positioning said type case.

41. A machine for producing lines of type face characters upon a receiving surface including control means for selecting a character to be impressed; a movable type case; a plurality of type members carried by said type case, said type members having type slugs and resilient means urging said type slugs within said type case; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached to said type members by threads to predetermine the extent of travel of said striking means.

42. A machine for producing lines of type face characters upon a receiving surface including control means for selecting a character to be impressed; a movable type case; a plurality of type members carried by said type case, said type members including housing members open at one end, type slugs having type faces disposed within said housing members with said type faces exposed, studs attached to said housing members opposite said open end, and resilient means urging said housing members within said type case; means for positioning said type case to bring selected type members individually to printing position; means for striking the type members to impress a series of characters on said receiving surface; means for positioning said type members when moved by said striking means; means for producing linear movement of said receiving surface in response to the extent of travel of said striking means; and means for controlling the extent of said movement through the individual type members to produce variable predetermined spacing, said means including spacer elements attached by threads to said studs to predetermine the extent of travel of said striking means.

References Cited in the file of this patent

UNITED STATES PATENTS

| | | |
|---|---|---|
| 22,423 | Harger | Dec. 28, 1858 |
| 572,350 | Arnold | Dec. 1, 1896 |
| 1,724,615 | Powers | Aug. 23, 1929 |
| 2,115,692 | Thorn | Apr. 26, 1938 |
| 2,142,009 | Siebert | Dec. 27, 1938 |
| 2,211,911 | Reid | Aug. 20, 1940 |